US006842122B1

(12) United States Patent
Langner et al.

(10) Patent No.: US 6,842,122 B1
(45) Date of Patent: Jan. 11, 2005

(54) CUSTOMIZABLE COCKPIT DISPLAY SYSTEMS AND METHODS OF CUSTOMIZING THE PRESENTATION OF COCKPIT DATA

(75) Inventors: Dale R. Langner, Olathe, KS (US); Philip I. Straub, Olathe, KS (US)

(73) Assignee: Garmin International, Inc., Olathe, KS (US)

( * ) Notice: Subject to any disclaimer, the term of this patent is extended or adjusted under 35 U.S.C. 154(b) by 16 days.

(21) Appl. No.: 10/086,996

(22) Filed: Feb. 28, 2002

(51) Int. Cl.[7] .............................................. G08B 21/00
(52) U.S. Cl. ...................... 340/945; 340/971; 340/973; 701/4
(58) Field of Search ................................ 340/945, 971, 340/974, 975, 973, 976, 977, 978, 979, 980, 990, 995; 701/3, 4, 11, 14, 200, 201, 202; 345/156, 173, 765; 455/158.2, 158.4; 342/357

(56) References Cited

U.S. PATENT DOCUMENTS

| | | | | | |
|---|---|---|---|---|---|
| 4,598,292 | A | | 7/1986 | Devino | 340/973 |
| 4,651,282 | A | * | 3/1987 | Robinson et al. | 455/158.2 |
| 4,845,495 | A | | 7/1989 | Bollard et al. | 340/973 |
| 5,528,248 | A | * | 6/1996 | Steiner et al. | 342/357 |
| 5,782,805 | A | * | 7/1998 | Meinzer et al. | 604/131 |
| 6,057,786 | A | * | 5/2000 | Briffe et al. | 340/975 |
| 6,112,141 | A | * | 8/2000 | Briffe et al. | 701/14 |
| 6,279,017 | B1 | * | 8/2001 | Walker | 707/529 |
| 6,285,298 | B1 | | 9/2001 | Gordon | 340/945 |
| 6,314,343 | B1 | * | 11/2001 | Adams et al. | 701/3 |
| 6,381,519 | B1 | * | 4/2002 | Snyder | 701/3 |
| 6,473,675 | B2 | * | 10/2002 | Sample | 701/3 |
| 6,614,419 | B1 | * | 9/2003 | May | 345/156 |

OTHER PUBLICATIONS

"Manual: Pilot's Guide—RMS 555 Bendix/King Radio Management System", *AlliedSignal Aerospace*, Copyright 1993, AlliedSignal, Inc., Olathe, KS, (Mar. 1, 1993), 52 pages.

* cited by examiner

*Primary Examiner*—Van T. Trieu
(74) *Attorney, Agent, or Firm*—Devon A. Rolf

(57) ABSTRACT

Systems and methods are provided for customized displays and customized presentations of cockpit data. Configurable soft keys or controls located in close proximity to a cockpit display are provided. Each key is configured to perform a desired display function or other function. Labels are displayed adjacent to each of the soft keys to identify each of the soft keys. A display is operable to provide multiple views, each view within the display is adapted to be overlaid with additional cockpit data if so configured. Furthermore, each view is capable of being presented from one or more selectable perspectives as desired.

27 Claims, 5 Drawing Sheets

CUSTOMIZABLE COCKPIT DISPLAY SYSTEMS AND METHODS OF CUSTOMIZING THE PRESENTATION OF COCKPIT DATA

CROSS-REFERENCE TO RELATED APPLICATIONS

This application is related to the following co-pending, commonly assigned U.S. patent applications: "Cockpit Instrument Panel Systems and Methods of Presenting Cockpit Data," Ser. No. 10/086,951; "Cockpit Control Systems and Methods of Controlling Data on Multiple Cockpit Instrument Panels," Ser. No. 10/086,929; "Cockpit Instrument Panel Systems and Methods with Redundant Critical Flight Data Display," Ser. No. 10/086,783; "Cockpit Display Systems and Methods of Presenting Data on Cockpit Displays," Ser. No. 10/086,598; and "Cockpit Instrument Panel Systems and Methods with Variable Perspective Flight Display," Ser. No. 10/086,573, each of which is by the same inventors and of which the disclosure is herein incorporated by reference in its entirety.

COPYRIGHT NOTICE/PERMISSION

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the screen layouts, and data as described below and in the drawings hereto: Copyright © 2002, Garmin Corporation, All Rights Reserved.

FIELD OF THE INVENTION

The present invention relates generally to cockpit display systems and methods of presenting data on cockpit displays. In particular, the present invention is directed to customizable cockpit displays with integrated cockpit instrument panels and methods of customizing the presentation of data on cockpit displays.

BACKGROUND OF THE INVENTION

Modern commercial/private aircraft, as well as older aircraft, include a myriad of instrumentation panels having controls and displays used to present information related to aircraft sensors. The controls and the displays are operated, viewed, and interpreted by a pilot/copilot during flight of an aircraft. Some of these controls are used for assisting the pilot/copilot with navigation, such as an altimeter, an airspeed indicator, a horizontal situation indicator, an attitude indicator, and the like. Other controls are used to permit radio communication with other pilots/copilots in the air or with air traffic controllers during flight. Still more controls, in recent years, are used to assist in navigation using Global Positioning Satellite (GPS) systems associated with satellite technology. Furthermore, transponder controls permit the aircraft to be uniquely identified and the aircraft's altitude communicated to air traffic controllers during flight.

For a neophyte, the quantity of controls, inputs, and display panels contained within the cockpit of an aircraft are daunting. Even experienced pilots/copilots must stay focused and alert to interpret information presented on various displays throughout the cockpit during flight and to access various controls and control inputs within the cockpit. As a result, pilots/copilots must continually scan a plurality of available displays for vital information at any particular moment in time during flight.

Conventionally, data associated with control devices, control inputs, and other sensors within the cockpit is distributed throughout the cockpit and presented on a number of displays. The various data is presented as static or conventional views within the displays. The provided views are generally not modifiable by the pilot/copilot. Accordingly, existing data views and/or data formats must be learned by the pilots/copilots, and the views cannot be individually tailored to increase the comprehension of the pilot/copilot, based on any preferences of the pilot/copilot.

In recent years, multifunction displays (MFDs) have been developed for use within the cockpit of an aircraft. Such MFDs generally contain a single display screen which provides flight data and other information associated with select aircraft sensors. Often, however, aircraft input controls are not integrated into a bezel surrounding the MFD, and sometimes such input controls are not even located in near proximity to the MFD. And, some MFDs only provide data associated with preprogrammed aircraft input controls. Correspondingly, the pilot/copilot still must manage a myriad of displays and controls located at various locations throughout the cockpit. Additionally, data presented within any one display is not necessarily well organized and structured to provide a meaningful integrated presentation to the pilot/copilot. In other words, within a single MFD related flight information data may not be logically grouped within like regions on the display, such that a single glance at the display would provide the pilot/copilot with all the desired data at any desired moment.

Moreover, existing displays do not readily permit configurable views, within the display, to include customizable overlays of additional relevant data. For example, a graphical view of an aircraft depicting the aircraft as it travels along a planned route toward a destination, generally is not customizable to permit the same graphical view to be overlaid with weather conditions occurring along the planned route, terrain conditions present along the planned route, and/or traffic conditions occurring along the planned route relative to other aircraft flying in close proximity to the planned route. And, even if some overlaid view is permitted, existing views may not allow the perspective of that view to be altered. For example, a pilot/copilot may not be capable of viewing the aircraft as it travels along the planned route from a top-down perspective, a bottom-up perspective, a birds-eye perspective, and the like. Accordingly, the pilot/copilot may be forced to accept the perspective provided with the view.

To further emphasize the problems associated with providing customization with existing MFDs, consider that conventional MFDs are not easily expanded to include additional functionality as a pilot/copilot desires. As a result, MFDs are not flexible and any modifications that require additional functionality, to support expanded display (e.g., view) integration features, requires expensive design modifications to controls, sensors, and software driving the presentation of data on the MFDs. As a result, customization within the MFD industry is rigid and cumbersome, and correspondingly pilots/copilots have learned to accept and use whatever features are provided with the MFDs by the designers/manufacturers.

Therefore, there exists a need for better customization and integration of cockpit display systems and instrument panels within the cockpit, which permit the pilot/copilot to more rapidly acquire and process flight information data from reliable regions within the display. Moreover, there exists a need for better customization and presentation of data within cockpit displays.

SUMMARY OF THE INVENTION

The above-mentioned problems related to cockpit data customization and presentation within cockpit displays and cockpit instrument panels, are addressed by the present invention and will be understood by reading and studying the following specification. Systems and methods are provided for customizing cockpit display and cockpit data presentation which provide better, more efficient and comprehensive data presentation of flight information. The systems and methods of the present invention offer improved cockpit display systems and cockpit instrument panels which provide more integrated, intuitive, customized, expandable, and efficient access to flight information.

In one embodiment of the present invention, a cockpit display system is provided. The system includes a display having a plurality of displayable regions where a number of the displayable regions are activated by a number of controls located on a bezel which encompasses the display. The system further includes a label display region presenting labels on the display, where each label is adjacent to one of the controls. Furthermore, a plurality of views are selectable within one or more of the displayable regions.

In another embodiment of the present invention, a cockpit instrument panel is provided. The panel includes a bezel encompassing a display, where the bezel includes a plurality of controls and display activation buttons. Also, the panel includes sensors operably coupled to the controls and the buttons. The sensors are proximately located to rear sides of the bezel and the display. The display is adapted to present a setting data strip in a first region, a label data strip in a second region proximately located adjacent to the display activation buttons, navigational data in a primary display region, and inset data in one or more inset regions, each inset region activated by one or the display activation buttons.

In still another embodiment, a method of customizing data presented on a cockpit display is provided, wherein buttons adapted to present inset views within a display or overlay views within the display are provided. The buttons are located proximate to the display. Further, labels are presented within the display and are adjacent to the buttons. Flight data is customized and presented within the display by configuring the inset views or the overlay views.

In yet another embodiment, cockpit display data presented on a display is provided. The display data includes labels presented within a label region, where the labels are associated with buttons which are proximate to the labels, and setting data presented within a setting region. Moreover, the display data includes primary data, inset data, and overlay data. The primary data are presented in a primary region, the inset data are presented in an inset region, and the overlay data are presented in an overlay region.

These and other embodiments, aspects, advantages, and features of the present invention will be set forth in part in the description which follows, and in part will become apparent to those skilled in the art by reference to the following description of the invention and referenced drawings or by practice of the invention. The aspects, advantages, and features of the invention are realized and attained by means of the instrumentalities, procedures, and combinations particularly pointed out in the appended claims.

DETAILED DESCRIPTION OF THE INVENTION

Figure 1:
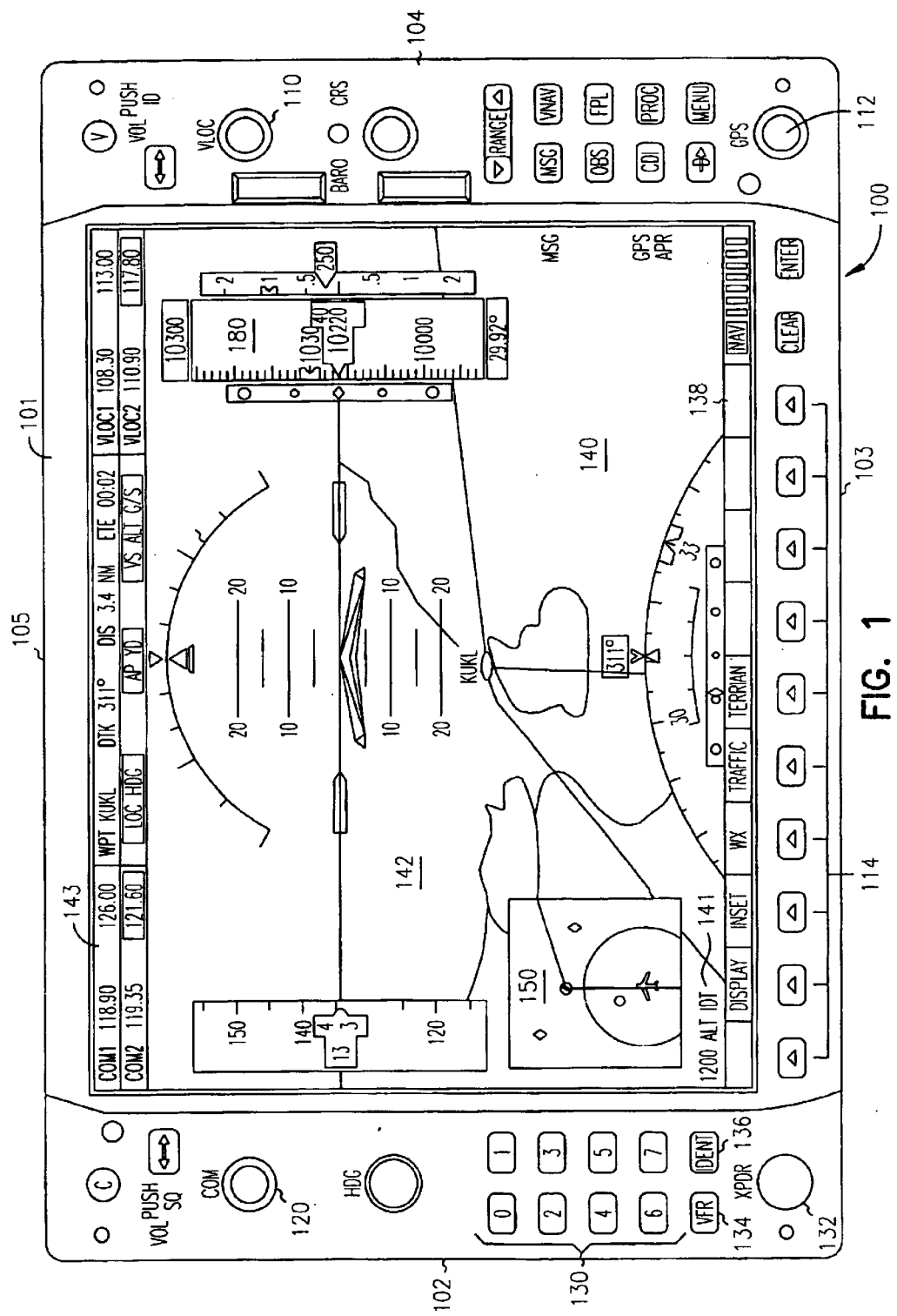
FIG. 1 is cockpit instrument panel and display system according to the teachings of the present invention.

In the following detailed description of the invention, reference is made to the accompanying drawings which form a part hereof, and in which is shown, by way of illustration, specific embodiments in which the invention may be practiced. The embodiments are intended to describe aspects of the invention in sufficient detail to enable those skilled in the art to practice the invention. Other embodiments may be utilized and changes may be made without departing from the scope of the present invention. The following detailed description is, therefore, not to be taken in a limiting sense, and the scope of the present invention is defined only by the appended claims, along with the full scope of equivalents to which such claims are entitled.

In the present invention, improved multifunction displays (MFDs) are provided. As used herein, a MFD is used broadly to include graphical user interface based (GUI-based) displays with integrated presentation data presented thereon using a variety of views. The views are configured on the MFDs to provide ready access to flight information data. In some embodiments of the present invention the use of the term MFD is employed in connection with or to refer to a primary flight display (PFD). In some embodiments of the present invention the use of the term MFD is employed in connection with or to refer to a navigation display (NAV display). Additionally, in some embodiments, multiple MFDs are included such that a first MFD is principally used as a PFD and a second MFD is principally used as a NAV display. In such embodiments, the second MFD or NAV display is in compliment to the PFD. In the present invention, multiple MFDs can be stacked one upon the other, or alternatively arranged side by side. Further, in some embodiments an MFD is adapted to include audio capabilities. As one of ordinary skill in the art will appreciate upon reading this disclosure, the flight information data which is presented on such MFDs can differ based on the aircraft type, e.g. frame and engine type.

In the invention, a "bezel" is provided as part of the MFDs. Typically, the bezel is the framed perimeter that surrounds a display, but is not part of the display itself. Further as used in this application, control data and instrumentation data, including flight information data, refer to data received by controls coupled to input devices, such as communication and navigational input devices, and data received from various equipment and sensors, such as the aircraft engine, fuel, airspeed, altitude and attitude sensors. For example, navigational and communication controls tune navigational and communication devices (e.g., VLOC receivers, radios, and the like) within the aircraft and permit software operating on a processing device to receive and process the communication and navigational data collected by such devices. Equipment and sensor instrumentation facilitate the presentation of data relating to such parameters as aircraft engine, fuel, airspeed, altitude and attitude.

In the present invention, this data can be operated on by software to generate one or more dynamic images on the GUI of a MFD display. As one of ordinary skill in the art will understand upon reading this disclosure, the display is capable of presenting text or graphical information. In some embodiments, the display of provides image or video data. In one example, the GUI depicts a present movement, path and/or projected destination of an aircraft relative to locations on the ground along with airspeed, altitude, attitude and engine data.

Although specific cockpit controls and particular flight information data are described herein, these descriptions are presented by way of example only and are not intended to limit the scope of the present invention. As one of ordinary skill in the art will understand upon reading this disclosure, any existing or customized controls and flight information data are readily integrated with one or more multifunction displays (MFDs) according to the teachings of the present invention. And, any combination and arrangement of the MFDs and the flight information data presented thereon are intended to fall within the scope of the present invention. According to the teachings of the present invention, flight information data is available at all times. As one of ordinary skill in the art will understand upon reading this disclosure, the MFDs are positioned within the cockpit so that a pilot/copilot can view and access communication and navigation controls proximately located to the MFDs at all times during flight.

According to the teachings of the present invention, the MFDs include GUI-based displays with integrated presentation data presented thereon using a variety of views, the views are configured on the MFDs to provide ready access to flight information data. In the invention, flight information data is available at all times.

Also, as used herein "soft keys" refer to specialized buttons or controls associated with the MFDs. Soft keys are selectable or configurable by a designer, manufacturer, vendor, or in some instances a pilot/copilot in order to alter views appearing on the displays. In this way, an identifying text label associated with a soft key appears within the display adjacent to the relevant soft key. In one embodiment, a pilot/copilot can traverse one or more menus associated with one or more soft keys and assign, define, and/or select a desired soft key to perform a particular display function. Moreover, depending upon the view or state of the display at any one time, a single soft key, in some embodiments, is used to perform one or more display functions, each independent function readily recognized by the associated label appearing adjacent to the soft key within the display.

As one skilled in the art will readily recognize, soft keys provide the ability for customization to the display without the need to alter sensors, controls, or buttons, and without the need to provide additional software to support a desired soft key function. This provides flexibility, increased ease of use, and increased functionality to cockpit display systems and panels according to the tenets of the present invention.

FIG. 1 illustrates one embodiment of an improved cockpit display system 100 according to the teachings of the present invention. As shown in FIG. 1, the system is a cockpit instrument panel 100. It is readily appreciated that the data and labels presented within panel 100 are presented by way of illustration only. The panel 100 includes a bezel 101. In the embodiment shown in FIG. 1, the bezel 101 has four sides namely, a left side 102, a bottom side 103, a right side 104, and a top side 105. In the embodiment shown in FIG. 1, a display 140 in the panel 100 is enclosed by the four sides (e.g., 102, 103, 104, and 105) of the bezel 101. However, the invention is not so limited, and correspondingly in some embodiments, the bezel 101 can be oriented on three or fewer sides of the display 140. As one of ordinary skill in the art will understand upon reading this disclosure, the scope of the invention includes a bezel 101 proximately located to the display 140 on panel 100. According to the teachings of the present invention, the panel 100 shown in FIG. 1 serves as a primary flight display (PFD) 100 and is any GUI-enabled device capable of presenting text, image, or video data. Further, in some embodiments the PFD 100 is adapted to include audio control capabilities.

According to the teachings of the present invention and as shown in FIG. 1, the bezel 101 has affixed thereon navigational input controls, such as VLOC 110 which is a control for localizing VHF Omnidirectional radio range often referred to as VOR. Further, the bezel 101 has affixed thereon communication input controls, such as COM 120 permitting radio communications with air traffic controllers and/or other pilots in the air. Also, the bezel 101 has affixed thereon additional input controls including; transponder input controls, such as numeric touch pad 130, XPDR control 132, IDENT control 136, and VFR control 134.

As will be understood by one of ordinary skill in the art upon reading this disclosure, the additional controls, 130, 132, 134, and 136, are one embodiment of the additional controls which can be included on bezel 101. However, the invention is not so limited. By way of example, and not by way of limitation, additional input controls such as GPS controls 112 and autopilot controls are included in the scope of the present invention. All of the above described controls are operable to manipulate the presentation of flight information data on display 140. For example, the pilot/copilot can use the numeric touch pad 130 to enter a unique identifying number required by the air traffic controllers to identify the pilot's aircraft. In FIG. 1, the text string "1200 ALT IDT" 141 presented on the display 140 includes the aircraft's transponder identity information. The IDENT 136 control permits the aircraft to uniquely be identified on an air traffic controller's display when requested. For example, if requested the pilot presses the IDENT 136 control, then the pilot's aircraft will be uniquely identified on the air traffic controller's display. Further, the XPDR 132 control activates or deactivates the transponder communications.

As mentioned above, in some embodiments the panel 100 includes a GPS control 112 for satellite navigation capabilities and includes autopilot controls 135. Further, in some embodiments text messaging controls or video telecommunication controls are affixed on the bezel 101. In this way, the numeric touch pad 130 includes alpha characters and/or symbol characters on each touch pad along with the numeric depicted in FIG. 1. As one of ordinary skill in the art appreciates, this permits a pilot/copilot to send and receive text messages to and from other pilots/copilots, the Internet, authorities, air traffic controllers, or other electronically interfaced sources wirelessly networked with the aircraft. Further video controls, in some embodiments, permit the pilot/copilot to view the cabin of the aircraft for disturbances or for the air traffic controllers to view different locations within the cockpit and/or cabin of the aircraft. Of course, text messaging and video streaming may be prohibited or undesirable, since these data may create distractions for the pilot/copilot, however, such presentation of these data are not precluded with the teachings of the present invention.

Additional controls affixed to the bezel 101 permit increased integration within the cockpit and provide customized presentations of data on display 140 of panel 100.

For example, soft key controls 114 located on the bottom side 103 of the bezel 101, permit the pilot/copilot to adjust the main display 140 by overlaying graphical data related to weather (e.g., labeled as WX in FIG. 1), traffic, and terrain. Further in some embodiments, the pilot/copilot customizes the display 140 by creating one or more insets within the display 140 such as inset display 150. Of course, it can be that the functionality of the soft key controls 114 are predefined and designed by a vendor, designer, or manufacturer, such that the pilot/copilot can access the functions which are predefined and embodied as the soft key controls 114 but cannot alter the functions.

In some embodiments, display 140 is logically segmented into a number of displayable regions. For example, the soft key controls 114 located on the bezel 101 appear adjacent and just below a label display region 138 of display 140, and a single label box, with or without label text data, appear above each of the soft key 114. For instance, the label "Traffic" appears adjacent and just above a single soft key 114. In the embodiment depicted in FIG. 1, not all of the soft keys 114 have a corresponding text label text data, in these instances each such soft key is available to be selected, populated, or customized by a designer, a manufacturer, a vendor, and in some instances a pilot/copilot in order to perform one or more customized functions within panel 100.

If a corresponding soft key 114 is activated/selected by a pilot/copilot when it includes a label in the label region, then a corresponding function will be executed. Accordingly, in FIG. 1 if a pilot/copilot were to activate the soft key 114 directly below the label "WX" appearing in the label region 138, then weather conditions represented as one or more graphical images would be overlaid in a primary displayable region 142, providing additional information to the pilot/copilot.

Each overlaid view selectable by reference to the label region (e.g., WX, Traffic, and Terrain depicted in the label region 138), and some inset views (e.g., 150) are activated by one or more of the soft keys 114. Moreover, each presented view is capable of providing a different perspective to the viewer, new view, or function to a pilot/copilot. For example, inset 150 provides a top-down view of the aircraft traveling along a projected route. Similarly the soft keys 114, in some embodiments, are selected or customized to adjust views within one or more displayable regions of display 140. Of course it is readily apparent that the soft keys 114 need not only provide visual information, since the soft keys can also be used to select and customize audio information as well, or to perform customized operations.

One skilled in the art will appreciate the fact that images presented within the display 140 are dynamic and change as data is received and processed from various sensors of the aircraft. Furthermore, in some embodiments the soft keys 114 are used to generate pop-up windows or sub-menus on display 140. In this way, pop-up or sub-menu windows interactively guide a pilot/copilot through a series of help data windows or menus and assist the pilot/copilot in selecting or customizing one or more of the soft keys 114. Soft keys 114, in some embodiments, also provide problem resolution data to the pilot/copilot should unexpected information be presented to the pilot/copilot or should the pilot/copilot desire some additional information. In this way and in some embodiments, the soft keys 114 provide an entire integrated display environment to the pilot/copilot without requiring additional updated software and additional input devices (e.g., a keyboard and/or mouse) to gain access to additional functionality, when the soft keys 114 are predefined and provided by a designer, a vendor, or a manufacturer.

Of course, in some instances the ability to enter text data associated with some operation of a soft key or overlay control 114 is desirable, and correspondingly the numeric key pad 130 depicted above the transponder control XPDR 132, includes text data to provide standard keyboard input. In still other embodiments, a voice-to-text interface permits the pilot/copilot to configure the soft keys or overlay controls 114 as needed and further permits soft key activation through the use of voice commands, in this way a pilot/copilot need not use hands or eyes to customize panel 100.

In another embodiment, the displayable regions include a flight setting data strip region 143, displaying flight setting information in a single contiguous location for ready reference by the pilot/copilot. In still more embodiments, each of the displayable regions is operable to display one or more of text messaging data, hypertext data links to additional data sources (e.g., reference materials, Internet sites, FAA provided data stores, and the like), help data, or data presented in thumbnail inset formats. Further in other embodiments, text or video streaming provides the pilot/copilot with news data, sports data, entertainment data, financial data, weather forecast data, science data, and other controller pilot data link communications data (CPDLC).

FIG. 1, is provided by way of example only, and one of ordinary skill in the art will understand, by reading and comprehending this disclosure, the manner in which the various arrows, markers and/or other indicators, e.g., the critical flight data indicators for airspeed, attitude, altitude, course heading and the like, will dynamically change relative to the aircraft's status and/or position. The present invention provides an improved PFD 100 which integrates all of the critical flight information therein and further permits additional pilot/copilot selection or designer/vendor customization.

Figure 2:
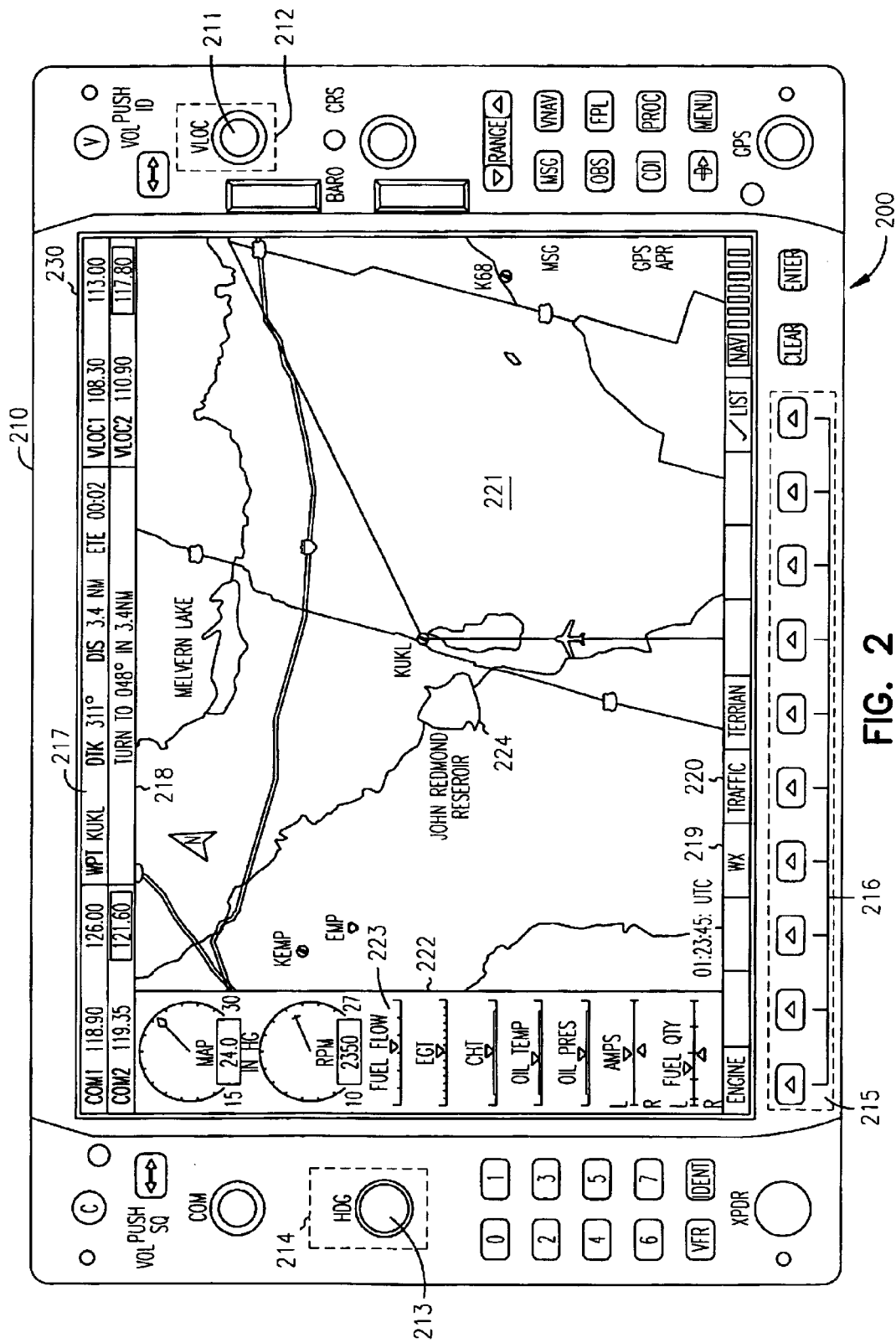
FIG. 2 is a cockpit instrument panel according to the teachings of the present invention.

FIG. 2 shows a cockpit instrument panel 200 according to the teachings of the present invention. As shown in FIG. 2, the panel 200 includes a bezel 210 encompassing a display 230. Moreover, the bezel 210 has a plurality of controls (e.g., 211 and 213) and display activation buttons 216. Proximate to the controls 211 and 213 and the buttons 216 are one or more sensors 212, 214, and 215, respectively. The sensors (e.g., 212, 214, and 215) are operably coupled and adapted to interface with the controls (e.g., 211 and 213) and the buttons 216.

In some embodiments, the sensors (e.g., 212, 214, and 215) are located behind (e.g., to a rear side) the bezel 210 and/or behind the display 230. The sensors (e.g., 212, 214, and 215) include electronic circuitry to interface with the controls 211 and 213 and the buttons 216 and provide and/or process data to produce the visual images appearing on display 230. Although only a few controls (e.g., 213 and 211), a few buttons (e.g., 216) and a few sensors (e.g., 212, 214, and 215) are labeled in FIG. 2, it is readily apparent that panel 200 can include one or more additional controls, buttons, and sensors. Thus, any reference to controls 213 and 211, buttons 216, and sensors 212, 214, and 215 are presented for purposes of illustration only and are not intended to limit the present invention.

The display 230 is adapted to present a setting data strip 217 in a first region 218 within the display 230. In some embodiments, the setting data includes communication settings (e.g., COM1 and COM2), navigational settings (e.g., VLOC1 and VLOC2), and navigation information, such as "DIS 3.4 NM" indicating that the distance to the desired destination identified as airport code "KUKL" is presently 3.4 nautical miles. Of course data, in other embodiments, include settings identifying equipment or sensors which are activated, autopilot settings, transponder settings, weather readings, and others.

Display 230 also includes a label data strip 219 in a second region 220 within the display 230. The label data strip 219 is proximately located adjacent to the activation buttons 216. In this way and in some embodiments, the label data strip 219 includes labels, such as "Engine," "WX" (e.g., abbreviation for weather), "Traffic," and "Terrain." The proximity of the buttons 216 to the label data strip 219 permit the pilot/copilot to accurately select a single button 216 located on the bezel 210, which is separate and apart from the display 230 itself. This permits designing/manufacturing of the buttons 216 to be independent of the software developed to drive the images on the display 230. In this way, a pilot/copilot can execute one or more pre-defined and packaged software operations by selecting the activation buttons 216. Therefore, by pressing or otherwise activating (e.g., voice-to-text interfaces, infrared pens, wireless mouses/devices, and the like) the buttons 216, a display function or other function is performed.

As a display function is performed, the state of the display 230 and the regions within the display 230 can be altered in such a manner that a previously reserved button 216 becomes available to perform an entirely different display function. In other words a content associated with label data strip 219 is modified by a certain button 216, such that a previous labeled button 216 receives a new label value and performs and entirely different display function. Also, as is readily apparent, although the term "display function" has been used for purpose of illustration, it will be readily understood by one skilled in the art that any function can be initiated from the buttons 216, and in some embodiments a single button 216 can cause the execution of a series of functions. This can provide, in some embodiments, a pilot/copilot with an application programming interface (API) to develop and customized the buttons 216 by using prepackaged low-level operations that are assembled and provided with appropriate arguments through the use of selected activation buttons 216 and sub-menu selections interactively displayed to the pilot/copilot. Of course as one of ordinary skill in the art readily appreciates, the ability to permit the pilot/copilot to use an interactive API defined by one or more states of the activation buttons 216, may not be desirable within the confines of present stringent aviation requirements, but such ability is not precluded by the teachings of the present invention.

Furthermore, although FIG. 2 depicts the second region 220 as being presented within the display 230 along the bottom of the display 230 in a horizontal fashion, it is appreciated that the present invention is not to be constrained by this illustration. The second region 220 is easily configured to be presented within the display 230 in any location with any orientation, and is only circumscribed by where the manufacturer of the bezel 210 placed the buttons 216 such that the label data strip 219 is proximately located adjacent to the buttons 216.

The display 230 of FIG. 2 further includes navigational data 224 located in a primary display region 221. In some embodiments, the primary display region 221 provides the dominant view of navigational data 224 desired by the pilot/copilot and is centrally and predominately located in the center of the display 230 for ready access and reference by the pilot/copilot as needed. For example, in FIG. 2 a top-down view of the aircraft is presented in the primary display region 221 along with the aircraft's orientation and position relative to a destination airport identified as "KUKL." Further, various terrain data such as the John Redmond Reservoir are depicted within the presented navigational data 224.

One or more inset regions 222 are provided within the display 230 as well and present inset data 223 on the display 230. In some embodiments, inset data 223, navigational data 224, and setting data 217 can include the same or similar data, such that the data is purposefully replicated and redundantly presented within one or more of the regions (e.g., 218, 220, 221, and 222) to provide the pilot/copilot with multiple references to desired information.

Inset regions 222 are configurable and/or activated by the buttons (e.g., soft keys) 216. For example, a label within the second region 220 identified as "Engine" is proximately presented above a first button 216 of FIG. 2, when a pilot/copilot activates this button 216, inset data 223 appears as inset region 222 in the display 230. In some embodiments, if the inset region 222 is already presented within the display 230, then activation of the first button 216 of FIG. 2, removes inset region 222 from the display and corresponding the inset data 223 which accompanies the inset region 222. As is recognized by the example presented in FIG. 2, inset data 223 includes engine parameter data or engine settings for the aircraft. Of course, any inset data is presentable within the inset region 222. Furthermore, the location of the inset region 222 is selectable or configurable, moreover the content of the presented inset data 223 is configurable. Again, configuration is achieved through the use of the buttons 216 combined with the second region 220 and its corresponding labels.

Another embodiment of panel 200 includes using the buttons 216 to overlay additional information within one or more of the regions (e.g., 218, 221 or 222) of the display 230. For example, the primary display region 221 of display 230 is overlaid with terrain data (e.g., additional data), such that both the navigational data 224 and the terrain data are overlaid on one another providing the pilot/copilot with more information. In fact, a variety of overlaid displays can be readily provided such as weather data, traffic data, equipment data, and others. Further in some embodiments, the data presented is overlaid in more than two layers (e.g., traffic and weather). Thus, in some embodiments data is presentable in more than two dimensions (e.g., traffic and weather), and the pilot/copilot can have a multidimensional view of any particular region (e.g., 218, 221, or 222) within the display 230.

In other embodiments, a view associated with each region (e.g., 218, 221, or 222) is configurable to provide different perspectives to the pilot/copilot. In this way, a top-down navigational view, instrument view (e.g., arc view or full view of a horizontal situation indicator instrument), and other views are customized according to the desires of the pilot/copilot. Still further, each region (e.g., 218, 220, 221, and 222) is presented with one or more visual cues to permit ready reference and identification by a pilot/copilot. Visual cues include, by way of example only, distinguishing colors (e.g., pilot/copilot defined data receiving unique color identification), distinguishing graphical symbols (e.g., lines, triangles, boxes, and the like), distinguishing fonts for text or graphical symbols, text and graphical symbols with effects (e.g., flashing text) and the like. Further, in some embodiments periodic audio alarms are combined with visual effects (e.g., beeps combined with flashing colored text or graphical elements) and provided to distinguish or identify important information within the display. However, as is readily apparent to one of ordinary skill in the art the audio alarms do not directly emanate from the display but rather from audio devices which are equally selectable and configurable with the present invention and provided via speakers integrated to a bezel proximate to the display, or within the cockpit.

Figure 3:
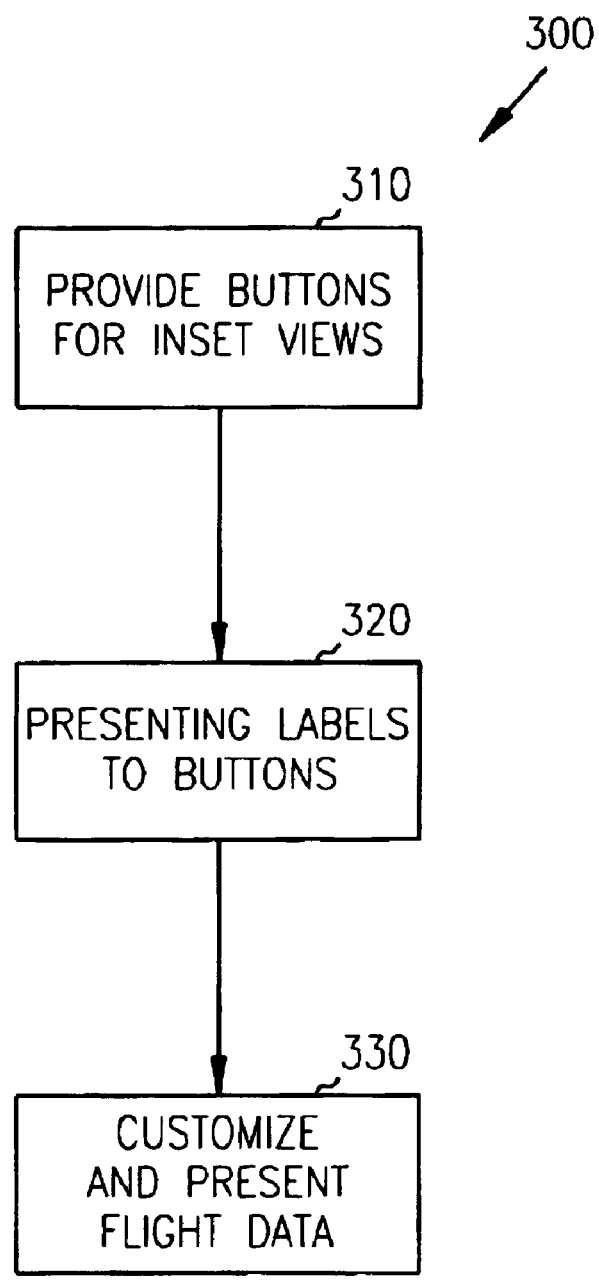
FIG. 3 is a flow chart of a method to customize data presented on a display according to the teachings of the present invention.

FIG. 3 shows a flow chart of one method 300 to customize data presented on a display according to the teachings of the present invention. Buttons are provided and proximately located near a display in block 310. In some embodiments, the buttons are also considered to be controls proximately located near the display. The buttons are adapted to present inset views or overlay views within the display. Each button is associated with a presented label in block 320 within the display and adjacent to its associated button. In this way, the presentation of the label within the display provides identifying information about a specific button and the button (e.g., soft key control) is operable to alter the display views.

In block 330, flight data is customized and presented within the display by activating one or more of the provided buttons. The inset or overlay views are thereby configured according to the activated button selection made by a pilot/copilot using method 300. A number of prepackaged customizations/functions are provided with a system/apparatus (e.g., MFD or PFD) implementing method 300 (e.g., cockpit display system), such that activation of the buttons provide predefined customizations/functions to the pilots/copilots of the system/apparatus (e.g., MFD or PFD).

Moreover, in some embodiments these customizations/functions can be transferred to computer readable media accessible to method 300 by using a portable electronic device, such that the customizations/functions to the buttons (e.g., soft keys) are acquired by a method 300 implemented on a computing device associated with a MFD/PFD. The transferring device can use wireless data transmissions, infrared data transmissions, or hardwired data transmissions. In other embodiments, customizations/functions are provided using removable-computer readable media interfaced to the MFD/PFD. In still more embodiments, and if permissible and desirable, the pilots/copilots define the customized functions associated with the buttons using menus and sub-menus associated with an interactive API embodied and activated within the buttons of the MFD/PFD.

Figure 4:
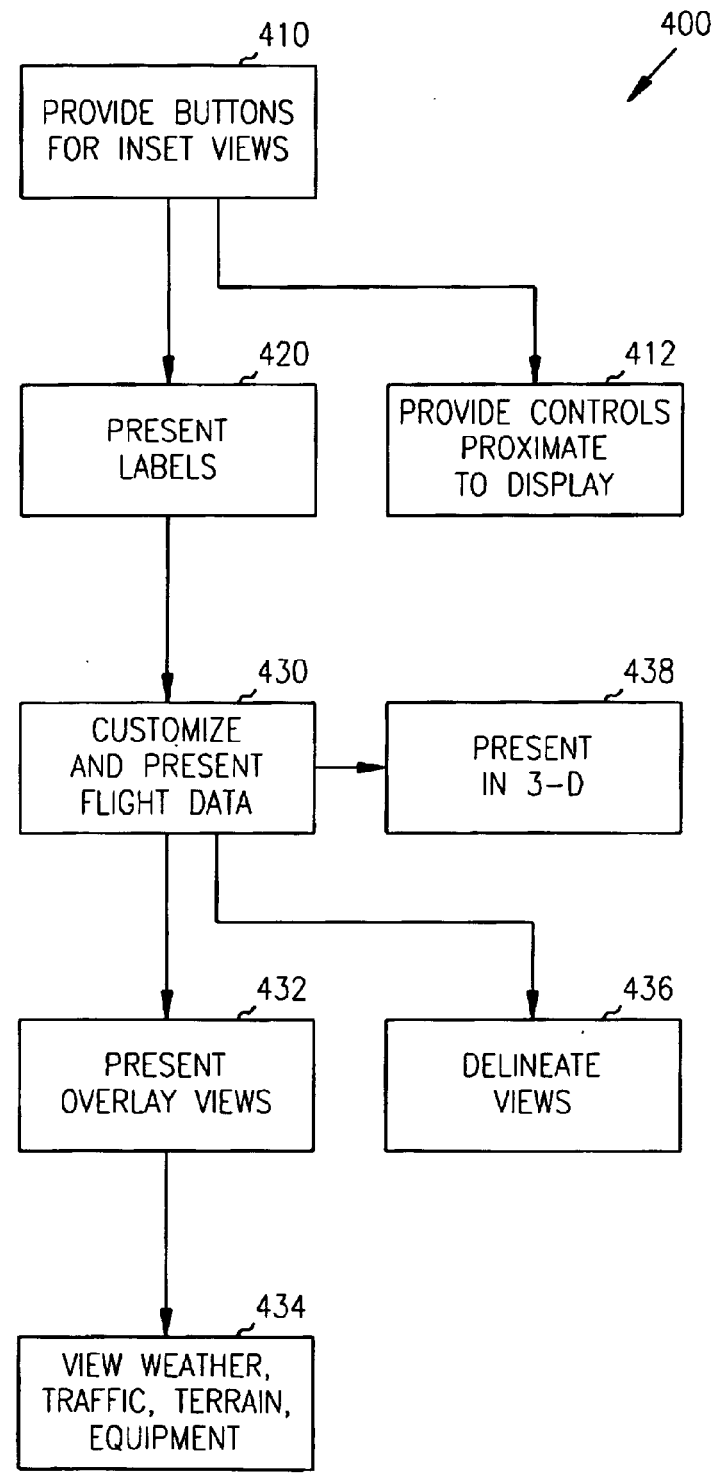
FIG. 4 is a flow chart of another method to customize data presented on a display according to the teachings of the present invention.

FIG. 4 is a flow chart of another method 400 to customize data presented on a display according to the teachings of the present invention. In block 410 function enabled display buttons/controls are provided and are adapted to present inset views within the display or one or more overlay views (e.g., block 432) within the display. Furthermore, the buttons/controls are located proximate to the display. In block 420, labels are presented within the display, the labels are adjacent to the buttons. In this way, the labels presented within the display identify a functionality of the buttons/controls and, being located proximate to those buttons/controls, identify the particular buttons/controls ("softkeys") operable to provide that functionality, e.g. the buttons/controls associated with the given label.

In block 430, flight data is customized for presentation within the display by actuation or selection of the buttons/controls in order to configure the inset views or the overlay views. That is, the views are selected by activating one or more of the buttons/controls. In one embodiment, the functions associated with the buttons/controls are predefined and provided by a designer, a manufacturer, or a vendor of a MFD/PFD. Also, in some embodiments the buttons/controls are themselves defined and customized by pilot/copilot interactions with method 400 by responding or directing the assignment of functions to specific buttons/controls when interacting with sub menus being presented on the display as buttons/controls are activated by a pilot/copilot. In this way, the display combined with the buttons/controls and predefined/provided software, associated with the buttons/controls of a MFD/PFD, drive the presented views on the display providing an interface to the pilot/copilot for generating customized views/functions, which are to then associated with defined buttons/controls of the MFD/PFD.

In block 432 the inset views or the overlay views are presented on the display. As shown in block 434, the inset views or the overlay views include, but are not limited to, weather views, traffic views, equipment views, terrain views, and the like. In various embodiments, as shown in block 436, each independent inset view or overlay view presented within the display is visually delineated to provide ready reference to a pilot/copilot using method 400. In some embodiments, flight data is presented in a three-dimensional format within the display, as shown in block 438. Furthermore, in other embodiments flight data includes data links, text messages, video streams, help data, communication data, navigational data, equipment data, and CPDLC data.

In yet another embodiment, additional controls, separate from the buttons/controls (e.g., soft keys) are provided concurrently with the soft keys, as shown in block 412. The additional controls are used to activate and control additional flight setting data within the display. These additional controls are also proximate to the display and adapted to modify at least a portion of the flight data when one or more of the additional controls are adjusted. For example, a COM control when turned in a clockwise or counterclockwise direction adjusts the frequency associated with a communication radio, and correspondingly the flight data which identifies the COM radio frequency is altered. The COM radio frequency is intended to be included within the meaning of the term flight data. Therefore, by adjusting the COM control at least a portion of the flight data is modified. Accordingly, the view reflecting that portion of the flight data is modified to reflect the changed frequency setting.

Although method 400 has been presented serially for purposes of illustration, it will be apparent to one skilled in the art that the processing order of the blocks depicted in method 400 is not critical. Correspondingly, presentation of the labels in some embodiments occurs before the buttons/controls are provided, this could occur when the designer/manufacturer of the buttons/controls views the display and the presentation of the labels before providing the buttons/controls proximate to the display in order to match the presentation of the labels. Of course, a variety of block execution sequences can occur, all of which are intended to fall within the scope of the present invention.

Figure 5:
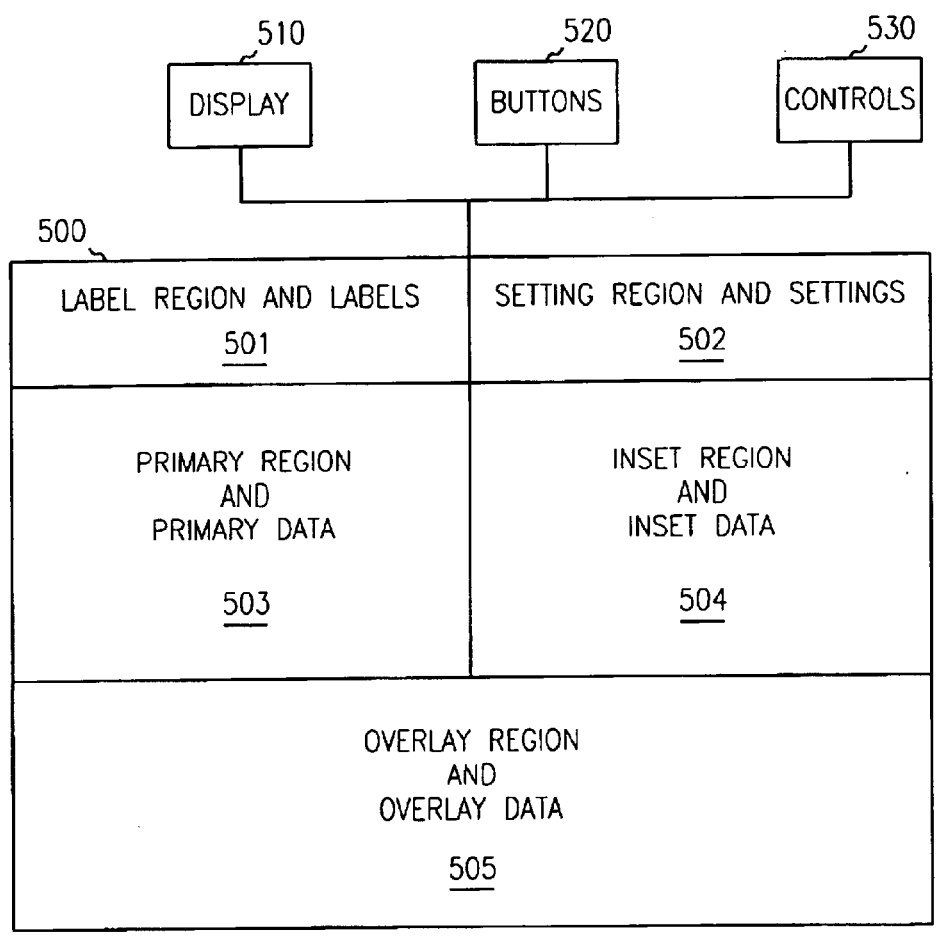
FIG. 5, is a diagram of cockpit display data according to the teachings of the present invention.

FIG. 5, shows a diagram of cockpit display data 500 according to the teachings of the present invention. The cockpit display data 500 is embodied in a computer readable medium (e.g., magnetic, optical, or both) and need not be stored within the medium contiguously as it can be processed and acquired dynamically from volatile (e.g., RAM, cache, or both) and/or non volatile (e.g., diskettes, CDs, DVDs, and the like) memory to logically assemble and form the cockpit data 500 embodied in FIG. 5. Further, cockpit data 500 is dynamic and regularly modified to reflect changes in the content associated with the data 500. Moreover, the cockpit data 500 can be transmitted or propagated through a variety of communication channels (e.g., wireless, infrared, Internet, hardwired data buses, internal processing registers, radio frequency, satellite, and the like). Additionally, depicts a number of hardware components (e.g. display 510, buttons 520, and controls 530) adapted to interface with and use the cockpit data 500. As one of ordinary skill in the art will appreciate the hardware components, e.g. display 510, buttons 520, and controls 530, are provided by way of illustration and not by way of limitation. Further, the hardware components depicted in FIG. 5, e.g. display 510, buttons 520, and controls 530, should not be confused with the cockpit data 500 which is not intended to illustrate a hardware component in and of itself.

The cockpit data 500, shown in FIG. 5, includes label data 501 presentable within a label region of a display, such as display 510. According to the teachings of the present invention, the label data 501 is associated with buttons (e.g., soft keys) 520 which are proximate to the label region of the display 510. The cockpit data 500 also includes setting data 502 presentable within a setting region of a display, such as display 510. The cockpit data 500 includes primary data 503 presentable within a primary data region of a display, such as display 510. As shown in FIG. 5, the cockpit data 500 includes inset data 504 presentable within an inset region of a display, such as display 510. And, as shown in FIG. 5, the cockpit data 500 also includes and overlay data 505 presentable within an overlay region of a display, such as display 510. In some embodiments, one or more additional controls, such as hardware controls 530, are proximately located near the display 510 to control content associated with the cockpit data 500 by adjusting sensors associated with acquiring and processing the data 500.

The primary data 503, the inset data 504, and the overlay data 505 include graphical data and text data. Such graphical and text data includes, but is not limited to weather data, traffic data, terrain data, equipment data, navigational data, communication data, news data, link data, sports data, financial data, science data, reference data, text message data, video streams, and any other CPDLC data. Moreover, in some embodiments portions of the content associated with any particular data (e.g., 502, 503, 504, and 505) can be replicated or duplicated in any portion of the other remaining data (e.g., 502, 503, 504, and 505).

According to the teachings of the present invention, the data, e.g. 501, 502, 503, 504, and 505 can be configured, or is selectable by a pilot/copilot by activating the buttons 520, which in turn causes software to be executed and additional information to be presented on the display 510 in order to achieve a desired configuration. Moreover, not only is the content of the data 500 configurable, but also in some embodiments the properties associated with the displayed regions of a display, such as display 510, can be configured by use of the buttons 520, and/or additional controls 530, to alter the coverage area (e.g., scale or zoom ratio) of the presented regions, text or graphic attributes of the regions, and the like.

Furthermore, in some embodiments, the data, e.g. 501, 502, 503, 504, and 505 can be configured, or is selectable by a pilot/copilot by activating the buttons 520, which in turn causes software to be executed and causes the primary region and the other regions of the display 510 to exchange views of the data to reflect different perspectives such as, and by way of example only, a top-down view, an instrument status view (e.g., depict instrument readings within a view), and other examples of the like.

Additionally as was presented above, the label data 501 can be modified when one or more of the buttons 520 are activated. In this way a display, such as display 530, can provide a variety of display states which are managed by a software application utilizing and processing cockpit data 500. As a result in some embodiments, if desired, the cockpit data 500 combined with the software application provide a pilot/copilot with not only an integrated and customized cockpit display presentation, but with an interface to effectuate pilot/copilot defined customized presentations.

As one of ordinary skill in the art will understand upon reading this disclosure, the methods of the present invention can be described in the context of computer-executable instructions, such as program modules, being executed by a computer. Generally, program modules include routines, programs, objects, components, data structures, etc. that perform particular tasks or implement particular abstract data types.

As one of ordinary skill in the art will understand upon reading and comprehending this disclosure, any one or more of the above features can be combined into a particular embodiment of the invention. Likewise, in the invention any one or a combination of the above functions can be optionally deactivated in the device. One of ordinary skill in the art will further understand that the method includes using a computer accessible medium having a set of computer executable instructions operable to perform the method. Other embodiments may be utilized and structural, logical, and electrical changes may be made without departing from the scope of the present invention.

In some embodiments, the methods provided above are implemented as a computer data signal embodied in a carrier wave or propagated signal that represents a sequence of instructions which, when executed by a processor, cause the processor to perform the respective method. In other embodiments, methods provided above are implemented as a set of instructions contained on a computer-accessible medium capable of directing a processor to perform the respective method. In varying embodiments, the medium includes a magnetic medium, an electronic medium, or an optical medium.

CONCLUSION

The above cockpit displays, cockpit instrument panels, systems and methods have been described, by way of example and not by way of limitation, with respect to improving customization, presentation, and integration of cockpit data. That is, the instrument panels, displays, systems, and methods provide for better customized control, access, and presentation of flight information within the cockpit. The data integration, perspective views, and placement of views within the cockpit displays and panels of the present invention provide for pilot/copilot selected/ configured flight information data which is more readily referenced when needed and provides for better comprehension of the data presented by the pilot/copilot.

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. It is to be understood that the above description is intended to be illustrative, and not restrictive. Combinations of the above embodiments, and other embodiments will be apparent to those of skill in the art upon reviewing the above description. The scope of the invention includes any other applications in which the above systems, devices and methods are used. The scope of the invention should be determined with reference to the appended claims, along with the full scope of equivalents to which such claims are entitled.

What is claimed is:

1. A cockpit display system, comprising:
 a display having a plurality of displayable regions wherein a number of the displayable regions are activated by a number of soft keys located on a bezel but not within the display which encompasses the display, and wherein a number of the displayable regions are operable to present graphical data;

a label display region presenting labels on the display, wherein each label is adjacent to one of the soft keys, and wherein each label associated with one or the soft keys can be modified or configured within the label display region for a particular one of the soft keys; and wherein a plurality of views are selectable within one or more of the number of displayable regions.

2. The system of claim 1, further comprising one or more overlay regions operable to present dynamic images overlaid on top of one another, wherein a number of the overlay regions reside within one or more of the number of displayable regions.

3. The system of claim 2, wherein one or more of the dynamic images are associated with at least one of a weather condition, a terrain condition, a traffic condition, and an instrument condition.

4. The system of claim 1, wherein the plurality of views include at least one of a perspective view, a top-down view, a birds-eye view, and an instrument view.

5. The system of claim 1, wherein one or more of the displayable regions are pop-up windows.

6. The system of claim 1, wherein the displayable regions are configurable.

7. The system of claim 1, wherein one or more of the displayable regions present at least one of text messaging data, data links, help data, and data in a thumbnail inset format.

8. A cockpit instrument panel, comprising:

a bezel encompassing a display, wherein the bezel includes a plurality of controls and display activation buttons not located within the display;

sensors operably coupled to the controls and the display activation buttons, wherein the sensors are proximately located to rear sides of the bezel and the display; and wherein the display is adapted to present a setting data strip in a first region, a label data strip in a second region proximately located adjacent to the display activation buttons, navigational data in a primary display region, and inset data in one or more inset regions, each inset region activated by one or the display activation buttons, and wherein the display is adapted to simultaneously present graphical data in the inset regions, and wherein the label data strip is modifiable and presented within the display and includes unique labels associated with particular ones of the display activation buttons.

9. The panel of claim 8, wherein the setting data includes at least one of communication settings, navigation information, equipment readings, and autopilot settings.

10. The panel of claim 8, wherein when one of the display activation buttons is activated, a content associated with the label data strip is modified.

11. The panel of claim 8, wherein one or more of the display activation buttons overlay additional data within one or more of the regions.

12. The panel of claim 11, wherein the additional data include at least one of weather data, traffic data, equipment data, and terrain data.

13. The panel of claim 8, wherein one or more of the controls are uniquely identified by at least one of a shape, a color, and a texture.

14. The panel of claim 8, wherein each of the regions are delineated within the display by one or more visual cues.

15. The panel of claim 8, wherein a side of the bezel is proximate to an audio panel, and the audio panel includes one or more audio controls operable to adjust the volume associated with audio data.

16. A method of customizing data presented on a cockpit display, comprising:

providing buttons adapted to present inset views within a display or overlay views within the display, wherein the buttons are located proximate and adjacent to the display but not within the display, and wherein at least one of the inset views or overlay views include graphical data;

presenting labels within the display adjacent to the buttons, and wherein the labels can be modified within the display and where each label is adjacent to one of the buttons; and customizing flight data presented within the display by configuring the inset views or the overlay views.

17. The method of claim 16, wherein in customizing the flight data, the overlay views include at least one of a weather reading, a traffic view, an equipment reading, and a terrain view.

18. The method of claim 16, wherein in customizing the flight data, the flight data are presented in a three-dimensional format on the display.

19. The method of claim 16, further comprising visually delineating the inset views within the display.

20. The method of claim 16, further comprising providing controls proximate to the display and adapted to modify at least a portion of the flight data when one or more of the controls are adjusted.

21. The method of claim 16, wherein in customizing the flight data, the flight data includes at least one of data links, text messages, video streams, help data, communication data, and navigational data.

22. Cockpit display data presented on a display comprising:

labels presented within a label region of a display, wherein the labels are associated with a number of buttons which are proximate and adjacent to the labels but not within the display, and wherein the labels can be modified and are presented within the display;

setting data presented within a setting region of the display;

primary data including graphical data and text data, and wherein the primary data are presented in a primary region of the display;

inset data including graphical data and text data, and wherein the inset data are presented in an inset region of the display; and overlay data including graphical data and text data, and wherein the overlay data are presented in an overlay region of the display.

23. The display data of claim 22, wherein the graphical data and the text data associated with the overlay data include at least one of weather data, traffic data, equipment data, and terrain data.

24. The display data of claim 22, wherein the labels are modified when one of the buttons are activated.

25. The display data of claim 22, wherein each of the regions of the display are configurable.

26. The display data of claim 22, wherein one or more of the regions of the display are controlled by controls proximately located to the display and the buttons.

27. The display data of claim 22, wherein the primary region and the inset regions of the display are operable to present one or more views.

* * * * *